US007607709B1

(12) United States Patent
Bryant

(10) Patent No.: US 7,607,709 B1
(45) Date of Patent: Oct. 27, 2009

(54) REVERSIBLE BULKHEAD ASSEMBLY FOR A VEHICLE

(76) Inventor: Wade W. Bryant, 349 Stephens Rd., Grosse Pointe Farms, MI (US) 48236

( * ) Notice: Subject to any disclaimer, the term of this patent is extended or adjusted under 35 U.S.C. 154(b) by 0 days.

(21) Appl. No.: 12/145,641

(22) Filed: Jun. 25, 2008

(51) Int. Cl.
*B60J 7/00* (2006.01)
(52) U.S. Cl. .............. 296/26.01; 296/26.08; 296/186.3; 296/190.08
(58) Field of Classification Search .............. 296/26.01, 296/26.08, 26.09, 26.1, 26.11, 181.1, 181.2, 296/181.3, 181.7, 186.3, 181.5, 193.04, 193.08, 296/35.3, 152, 198.08; 410/121, 129
See application file for complete search history.

(56) References Cited

U.S. PATENT DOCUMENTS 5,263,757 A * 11/1993 Reed ........................ 296/24.43
6,474,713 B1    11/2002 Ruck et al.
7,318,614 B2     1/2008 Steiger et al.

* cited by examiner

*Primary Examiner*—Joseph D Pape
(74) *Attorney, Agent, or Firm*—Quinn Law Group, PLLC

(57) ABSTRACT

A vehicle includes a body defining a vehicle interior and a cargo bed, and a reversible bulkhead assembly that is positioned between the interior and the cargo bed. The bulkhead rotates with respect to the vehicle body to alternately provide a first cargo bed configuration and a different second cargo bed configuration. A concave side of the bulkhead is rotated adjacently to the vehicle interior to decrease the length of the cargo bed and increase the size of the vehicle interior in one configuration, and adjacently to the cargo bed to increase the length of the cargo bed while decreasing the size of the vehicle interior in another configuration. An optional pivoting mechanism can slow the rotation of the bulkhead, and can also or alternately prevent rotation of the bulkhead in one direction to facilitate repositioning of the bulkhead between the two positions.

18 Claims, 7 Drawing Sheets

US 7,607,709 B1

REVERSIBLE BULKHEAD ASSEMBLY FOR A VEHICLE

TECHNICAL FIELD

The invention relates generally to a vehicle bulkhead, and in particular to a reversible bulkhead assembly which can be selectively rotated or positioned to provide a pair of distinct passenger/cargo configurations.

BACKGROUND OF THE INVENTION

The passenger compartments, crew cabs, or interiors of pickup trucks and certain sport utility vehicles (SUVs) include a wall, panel, or bulkhead that is positioned behind the rear-most row of seats. The bulkhead separates the interior from a cargo bed portion of a rear cargo area. A typical bulkhead is a stationary metal panel that is supported at or along its perimeter by the vehicle body. In some vehicles, the bulkhead is replaced with a midgate assembly having one or more hinged door panels and/or windows for accessing the rear cargo area. However, conventional bulkheads or midgate assemblies may be less than optimal for certain purposes.

SUMMARY OF THE INVENTION

Accordingly, a vehicle is provided having a body and a reversible bulkhead assembly. The body defines an interior as well as a rear cargo area having a platform or bed. The reversible bulkhead assembly is positioned between the interior and the cargo bed, and is selectively rotatable with respect to the body to provide two possible bed configurations: a reduced-length bed with an increased-length interior, and an increased-length bed with a reduced-length interior. In either configuration, the interior remains fully enclosed, i.e., separated from the rear cargo area.

The reduced-length bed configuration, also referred to herein as the "passenger mode", provides additional room within the interior as needed by increasing the length of the interior, such as might be desirable when additional passenger space is temporarily needed. The increased-length bed configuration, also referred to herein as the "cargo mode", effectively reduces the available space in the interior of the vehicle by reducing its length, while at the same time extending the length of the cargo bed, thus providing the vehicle with additional cargo capacity.

The reversible bulkhead assembly is rotated with respect to the body, either directly or using a separate pivoting mechanism. To facilitate rotation, the reversible bulkhead assembly can be formed and/or shaped from a relatively light weight material as described herein. Likewise, the reversible bulkhead assembly can be formed with one or more openings or windows, if desired, which in turn can be shaped and/or sized consistently with the intended design of the vehicle. Latches can be used to secure the reversible bulkhead assembly to the body when the reversible bulkhead assembly is fully positioned into one of the two possible configurations or modes, with the latches being at least partially concealed by the doors of the vehicle for security according to one embodiment.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 7b is a schematic perspective view of a portion of the pivoting mechanism of FIG. 7a.

DESCRIPTION OF THE PREFERRED EMBODIMENTS

Figure 1:
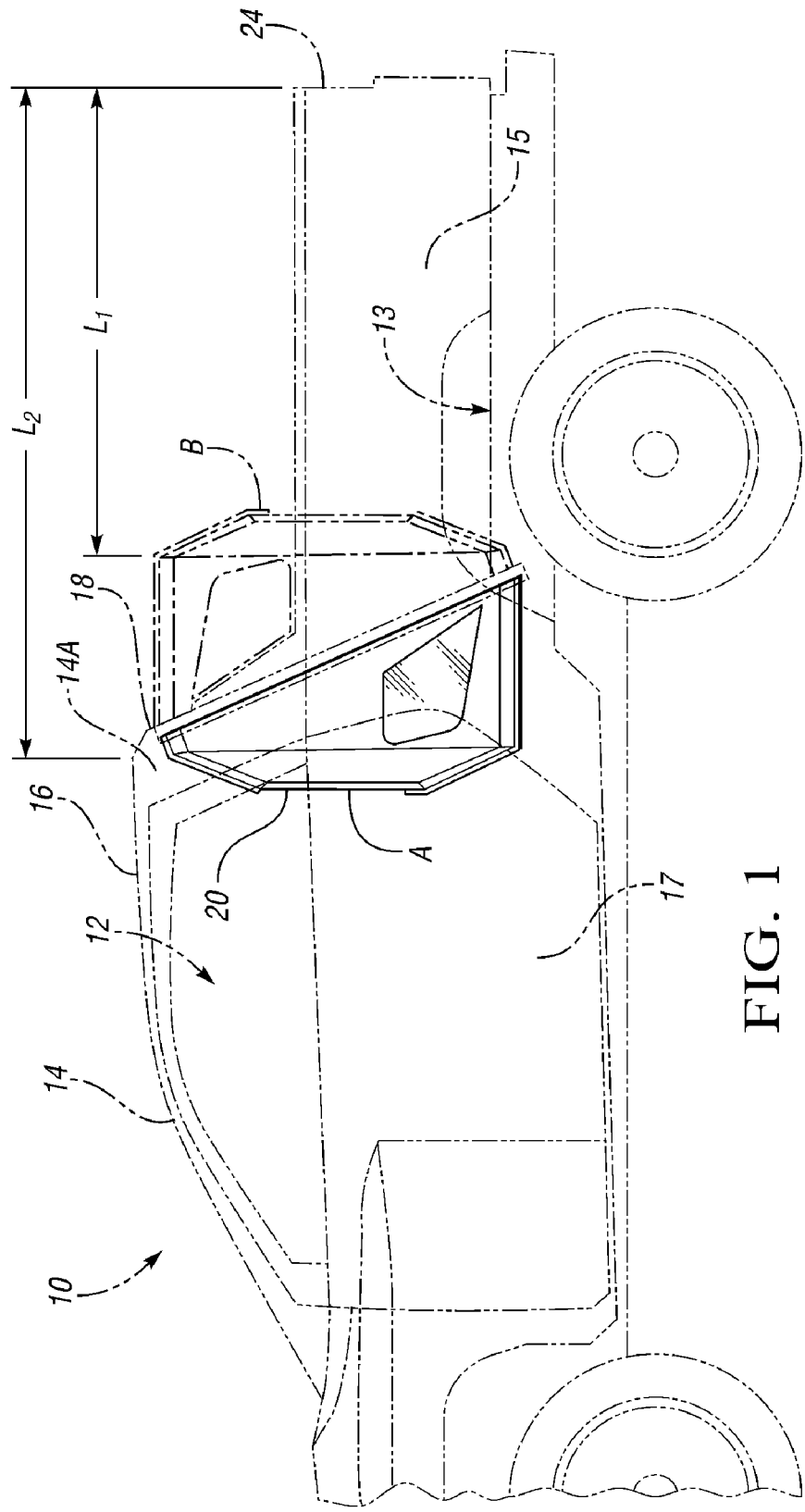
FIG. 1 is a schematic side view of a vehicle having a reversible bulkhead assembly in accordance with the invention.

Referring to the drawings wherein like reference numbers correspond to like or similar components throughout the several figures, and beginning with FIG. 1, a vehicle 10 includes a vehicle body 14 and a reversible bulkhead assembly or bulkhead 20 according to the invention. In the embodiment depicted in FIG. 1, the vehicle 10 is configured in the style of a pickup truck, and includes a pair of cargo box sidewalls 15 and a tailgate 24 that cooperate to at least partially define a rear cargo area having a bed 13. However, within the scope of the invention other vehicle body styles may also be used, such as sport utility vehicles (SUVs), crossover vehicles, work trucks, certain recreational vehicles, or other vehicles having a similar bed to that of the bed 13, whether such a bed is open or partially/fully enclosed.

The body 14 also defines a crew cab, a passenger compartment, or an interior 12 that is adjacent to the bed 13. A set of doors 17 provide access to the interior 12. The body 14 includes a side portion or a pillar 14A having a rearmost surface 18, with the pillar 14A each being positioned or disposed between the interior 12 and the bed 13. Such pillars 14A may be configured to provide additional rollover support to the body 14, such as by supporting a roof 16, depending on the intended design of the vehicle 10.

The body 14 or another suitable portion of the vehicle 10 at least partially supports the reversible bulkhead 20. The bulkhead 20 is "reversible" in that its orientation can be changed between a front-facing and a rear-facing direction with respect to the vehicle 10. That is, the bulkhead 20 is shaped, contoured, configured, and/or sized to allow the bulkhead 20 to be selectively rotated between a first position and a second position, which are labeled "A" and "B" respectively in FIG. 1. That is, when the bulkhead 20 is rear-facing as represented by position A, the length ($L_2$) of the bed 13 is increased or expanded to provide a first cargo bed configuration. When the bulkhead 20 is front-facing as represented by position B, the length ($L_1$) of the bed 13 is decreased or reduced relative to the length ($L_2$) at position A to provide a second cargo bed configuration. As shown in FIG. 1, due to the concave/convex structure of the bulkhead 20, a tradeoff occurs between the interior 12 and the bed 13, with an increase in a length of one of the interior 12 or 13 corresponding to a decrease in the length of the other. For clarity, position or configuration A will be referred to hereinafter as the "cargo mode", and position or configuration B will be referred to as the "passenger mode".

Figure 2:
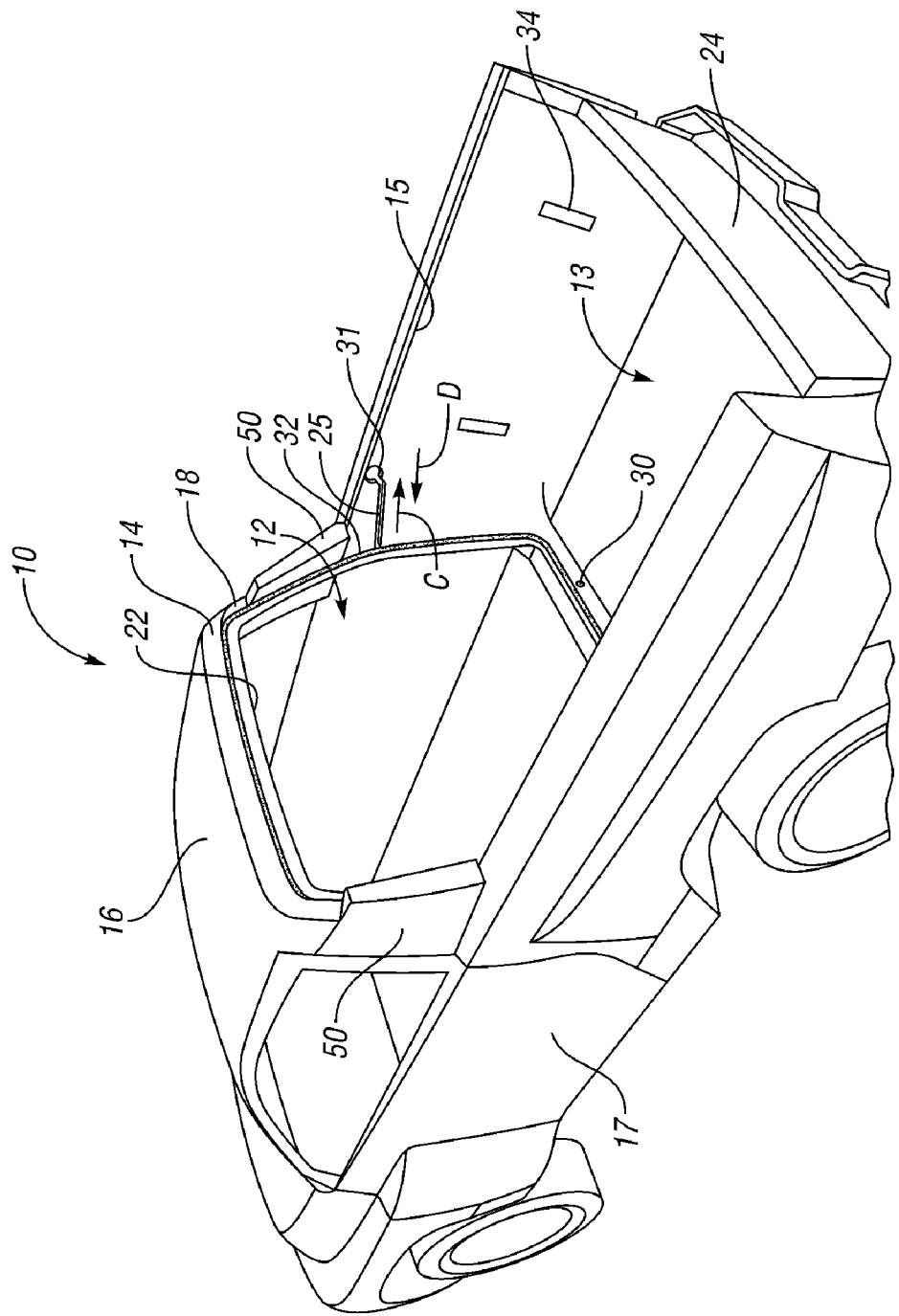
FIG. 2 is a schematic perspective view of the vehicle of FIG. 1.

Referring to FIG. 2, the vehicle 10 of FIG. 1 is shown with the bulkhead 20 removed from the vehicle 10 for clarity. To enable use of the bulkhead 20, which is described below with reference to FIG. 3, an opening 22 is provided or formed in the body 14 between the interior 12 and the bed 13. A seal 32 around the perimeter of the opening 22 seals against the bulkhead 20 of FIG. 3, as described below, to ensure that the interior 12 is protected from the elements. To facilitate draining of the bed 13, an optional drain 30 can be formed or provided in a suitable portion of the body 14, with the number and/or design of the drain 30 being sufficient to allow any accumulated water to properly drain from the bed 13 by means of gravity. The bed 13 can be configured to include wells 34 of the type known in the art for receiving, for example, lengths of 2"×4" lumber for forming a platform above the bed 13.

As shown in FIG. 2, an inclined slot 25 can be formed or provided in one or both of the sidewalls 15 of the vehicle 10, with the inclined slot 25 terminating in a circular end or pivot opening 31. The pivot opening 31 can then be sized and/or shaped to receive a dowel, a peg, a guide rod, or a pin 45 of the bulkhead 20 (see FIG. 3). In this manner, the bulkhead 20 is allowed to rotate within the pivot opening 31. The pins 45 can be slid, directed, or otherwise moved along the inclined slots 25 in the direction of arrow C, with the inclined slots 25 guiding a respective pin 45 (see FIG. 3) toward and ultimately into the pivot opening 31. The inclined slots 25 are sufficiently angled or inclined with respect to the horizontal in order to allow the bulkhead 20 to be positioned above the level of the bed 13 prior to its rotation.

Figure 3:
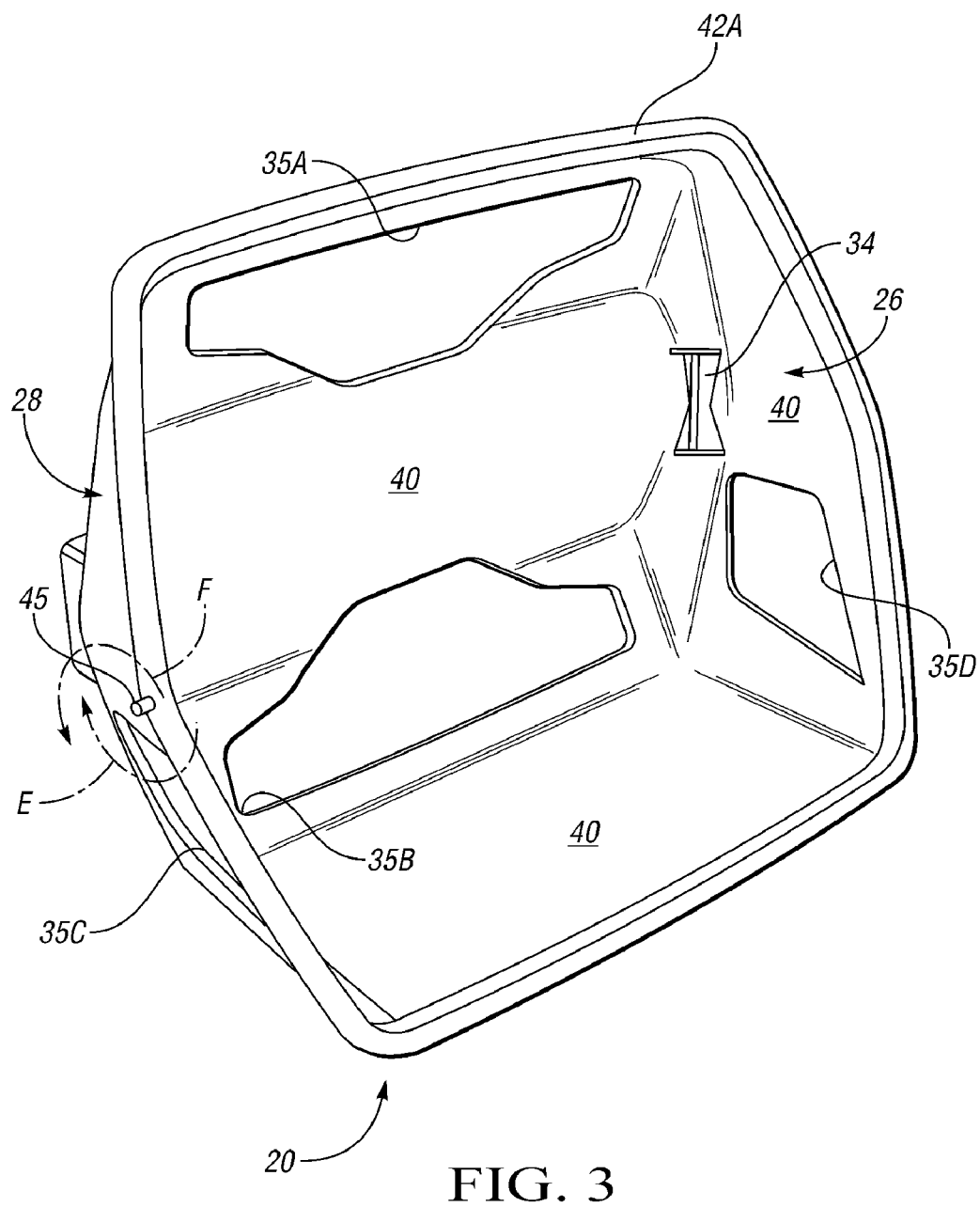
FIG. 3 is a schematic perspective view of the reversible bulkhead assembly shown in FIG. 1.

Once the bulkhead 20 of FIGS. 1 and 3 is seated in the pivot openings 31, the bulkhead 20 can freely rotate approximately 180 degrees in the desired direction, and then move or slide in the direction of arrow D toward the surface 18, against which the bulkhead 20 is sealed. In this manner, the different cargo mode and passenger mode cargo bed configurations shown at positions A and B of FIG. 1 are enabled. In order to secure the bulkhead 20 to the body 14 once a desired one of the positions A and B is attained, a pair of clasps, clamps, or latches 50 can be used to prevent the bulkhead 20 of FIG. 3 from rotating out of position, as will be described in more detail below.

Referring to FIG. 3, the bulkhead 20 has a plurality of surfaces or walls 40 which are sized, shaped, and/or otherwise configured to provide the bulkhead 20 with a concavity or a concave side 26, with a convex side 28 thus formed on the obverse of the concave side 26. The bulkhead 20 is ideally constructed of a suitable lightweight material such as plastic, composite material, and/or lightweight metal, which can be molded, shaped, and/or bonded as needed in order to provide the bulkhead 20 with the desired geometry, shape, and/or contour. The walls 40 define a sealing surface 42A on the concave side 26, and a substantially similar sealing surface 42B (see FIG. 5) on the convex side 28. The walls 40 may also define one or more wells 34 as described above, and a plurality of optional openings or windows 35A-D, which in turn can be covered or closed with a suitable flexible or shatter-resistant material, such as safety glass, polycarbonate, polypropylene, etc.

That is, depending on the particular cargo mode or passenger mode enabled by positioning the bulkhead 20 at positions A or B (see FIG. 1), each position being enabled simply by rotating the bulkhead 20 approximately 180° about the pins 45 in the direction of arrows E and D, respectively, one or more of the windows 35A-D can be positioned immediately adjacent to the body 14 (see FIGS. 1 and 2). The motion of the bulkhead 20 and the close proximity to the body 14 therefore suggests that any material used for covering the windows 35A-D should be selected to be sufficiently rugged and/or shatter-resistant.

Figure 4:
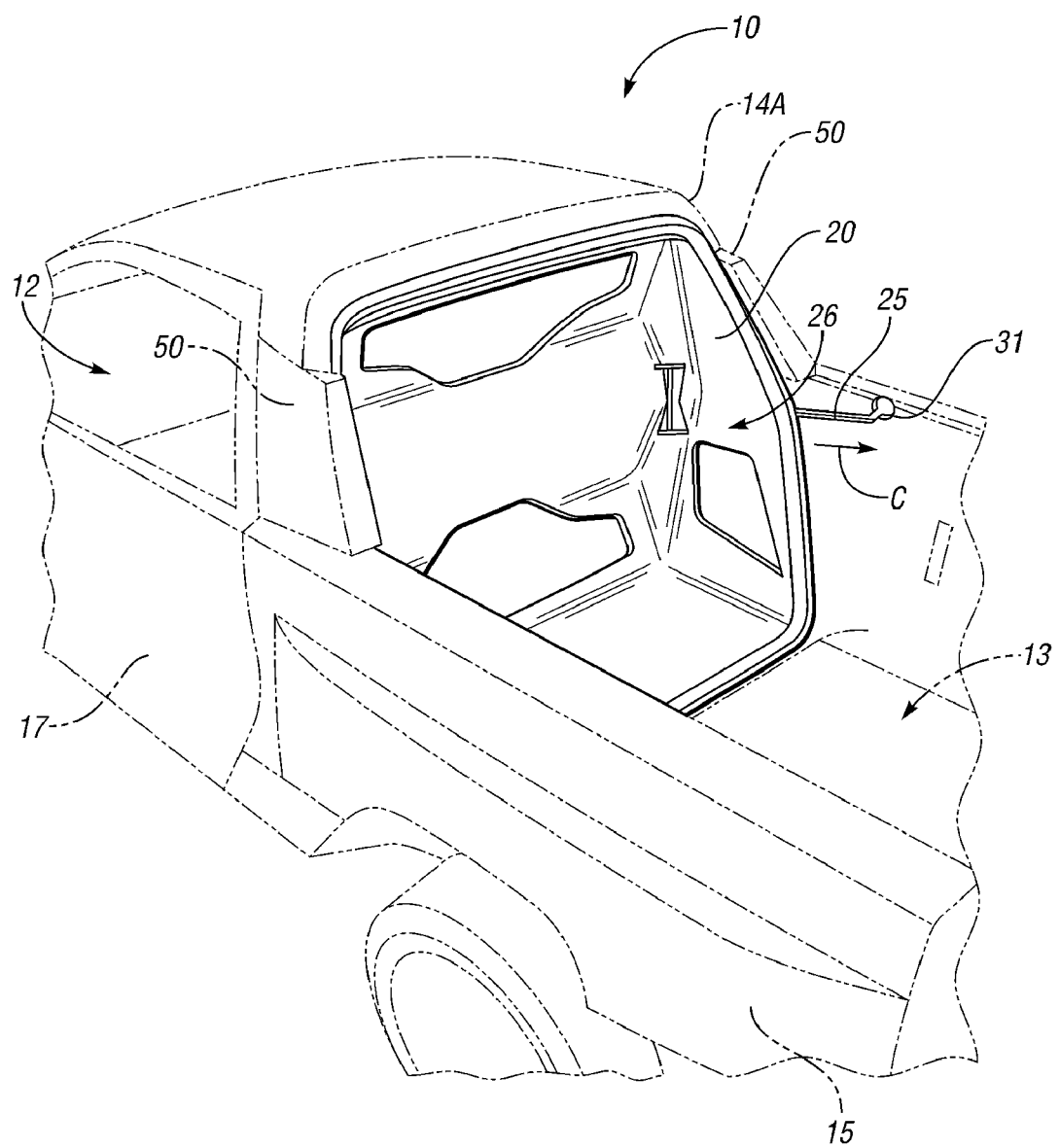
FIG. 4 is a schematic perspective view of the vehicle of FIG. 1 with the reversible bulkhead assembly positioned in a "cargo mode" or a first configuration.

Referring to FIG. 4, position A of FIG. 1 is shown, i.e., the "cargo mode", which is a configuration that effectively reduces the interior 12 and extends the length of the bed 13. The bulkhead 20 is retained along a portion of its periphery by the latches 50. The latches 50 can be configured as any latching mechanism preventing the rotation of the bulkhead 20 out of position. In the exemplary embodiment of FIG. 4, the latches 50 partially wrap around or clasp a portion of the periphery of the bulkhead 20 to prevent the bulkhead 20 from rotating out of position until the latches 50 are released. For additional security and/or for a finished aesthetic look, the latches can be positioned so that the door 17 minimizes access to the latches 50, such as by positioning any moveable or actuatable portion (not shown) of the latches 50 within the door jam area (not shown) so as to be inaccessible once the door 17 has been closed. When the latches 50 are unlocked or opened, and the bulkhead 20 is free to move or rotate in the direction of arrow C. The pins 45 (see FIG. 3) again can move or slide within the slot 25 toward and into the pivot hole 31, where the bulkhead 20 can freely rotate to position B (see FIG. 1), as will now be described with reference to FIG. 5.

Figure 5:
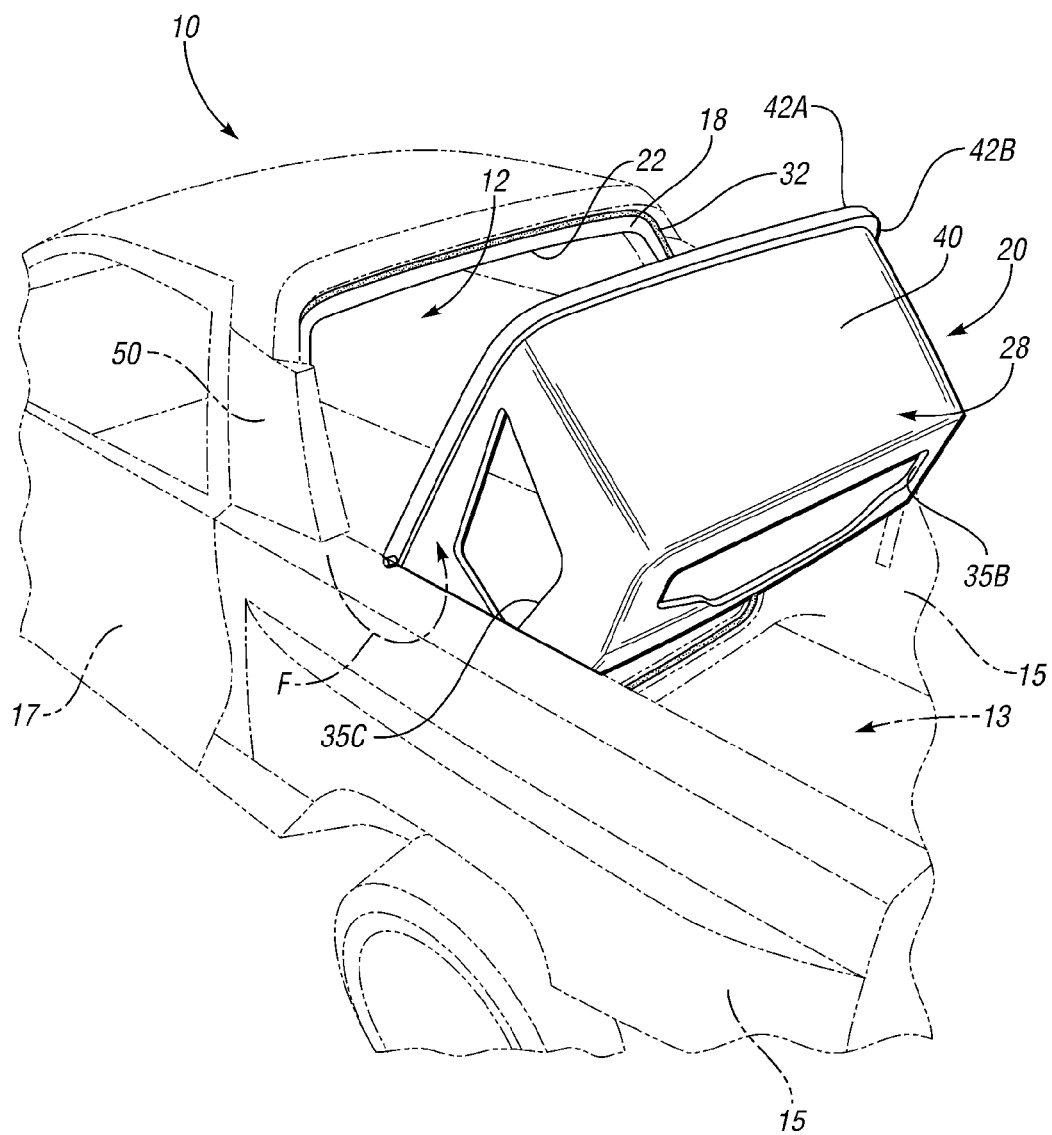
FIG. 5 is a schematic perspective view of the vehicle of FIG. 1 with the reversible bulkhead assembly as it is being repositioned into a "passenger mode" or second configuration.

Referring to FIG. 5, the bulkhead 20 is shown as it appears approximately midway between the "cargo mode" or first configuration of FIG. 4 and position B of FIG. 1, i.e., the "passenger mode" or second configuration. The passenger mode provides additional length or space within the interior 12 as needed, such as might be desirable on those occasions during which an additional row of seats (not shown) is temporarily needed. The bulkhead 20 is rotated in the direction of arrow F, so that the sealing surface 42A of the bulkhead 20 is presented adjacently to the seal 32 around the opening 22. At the position shown in FIG. 5, the pins 45 (see FIG. 3) remain seated within their respective pivot holes 31 (see FIG. 2).

Figure 6:
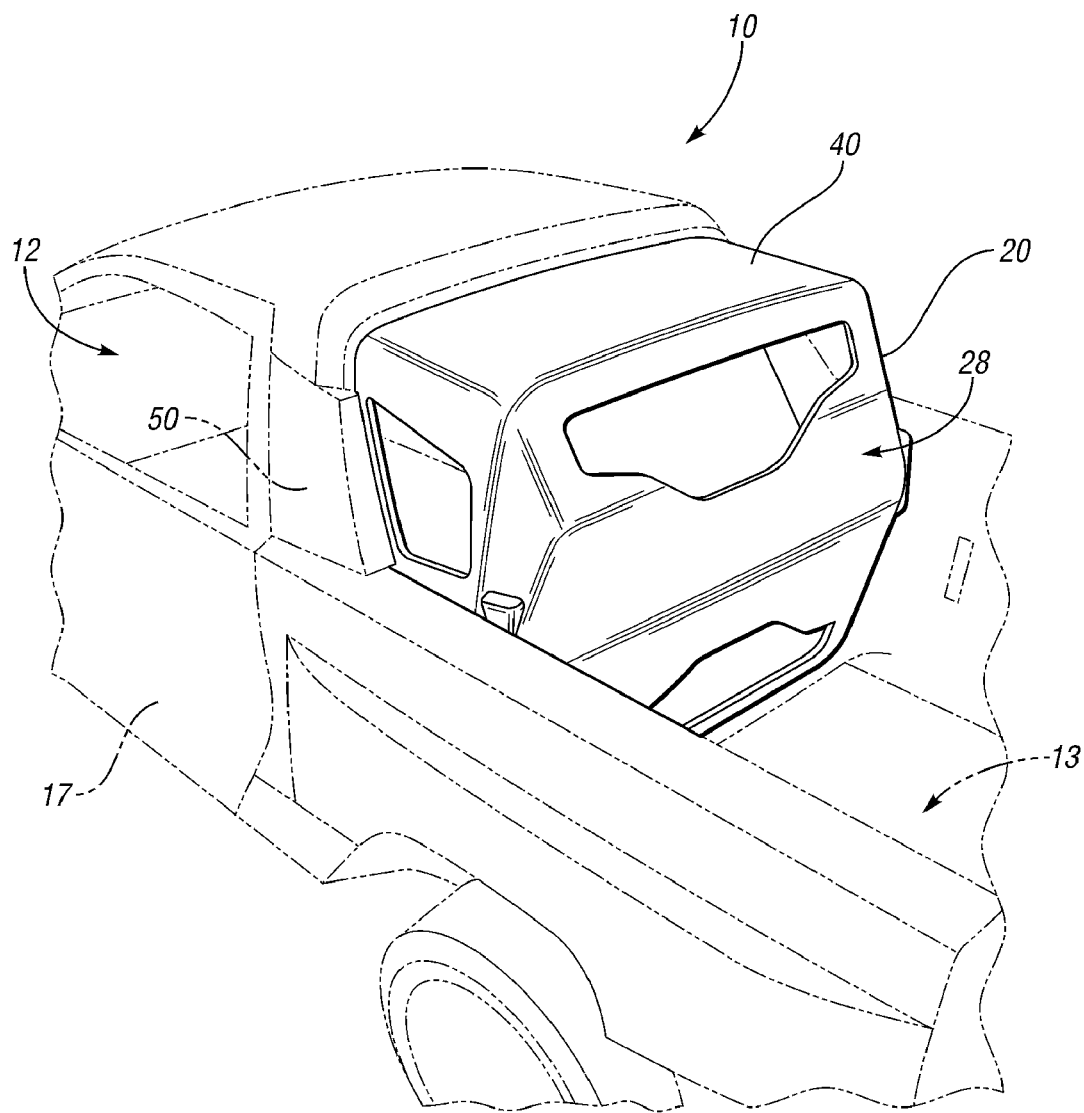
FIG. 6 is a schematic perspective view of the vehicle of FIG. 1 with the reversible bulkhead assembly positioned in the "passenger mode" or second configuration.

Referring to FIG. 6, after being fully rotated, the bulkhead 20 is guided down the incline of the slot 25 (see FIG. 2), and once again secured or fastened using the latches 50 or other suitable means. The convex side 28 of the bulkhead 20 now faces the bed 13, with the concave side 26 facing the interior 12. The passenger mode or second configuration, i.e., position B of FIG. 1, is thus provided. An additional row of seats (not shown) could then be added to the interior 12 in the passenger mode, or additional storage space provided behind the driver for covered transport within the interior 12.

Figure 7A:
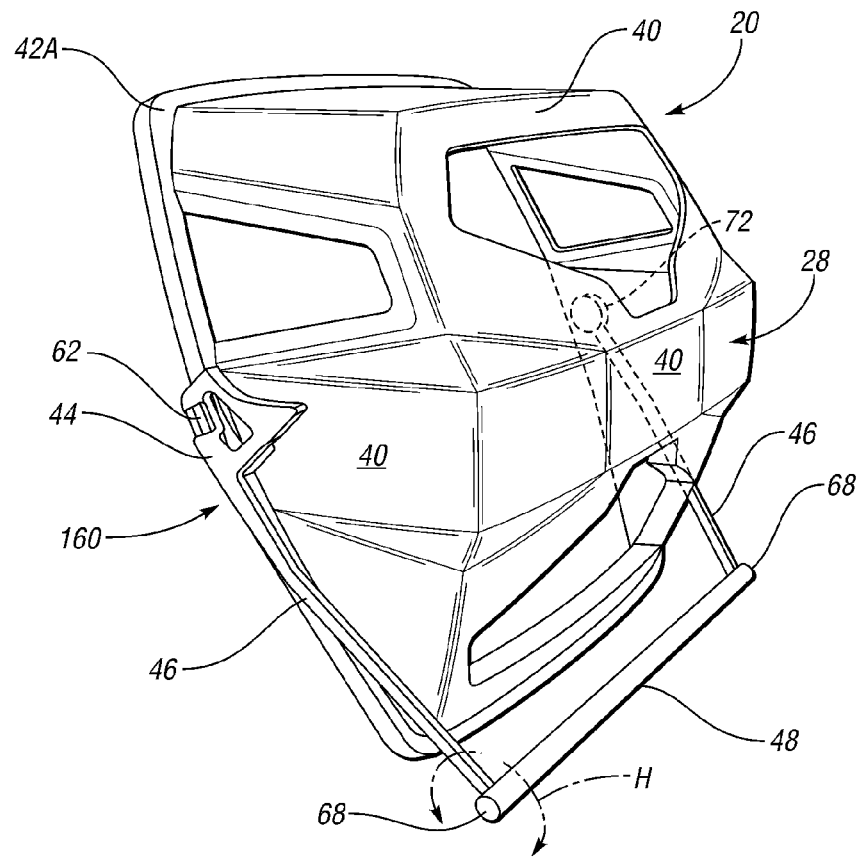
FIG. 7a is a schematic perspective view of the reversible bulkhead assembly of FIG. 3 and a pivoting mechanism according to one embodiment.

Referring to FIG. 7a, in another embodiment a pivoting mechanism 160 rotatably supports the bulkhead 20 rather than directly connecting the bulkhead 20 to the body 14 of FIG. 2 via the slots 25 and pins 45 as described above. According to one embodiment, the pivoting mechanism 160 includes a pair of longitudinal members or forks 46 and a transverse member or cross-link 48. The forks 46 extend radially from the cross-link 48, which extends laterally across the body 14 (see FIG. 1). The forks 46 are operatively connected to the cross-link 48 using any suitable means, such as but not limited to welding, bonding, fasteners, etc., with each of the forks 46 and the cross-link 48 configured as a beam, bar, arm, or other suitable linkage.

One of the forks 46 can be operatively connected to or formed integrally with a handle portion 44, which can in turn include a gear mechanism 62 for selectively preventing rotation of the bulkhead 20, with the gear mechanism 62 described below. The other fork 46 can be operatively connected to a damper mechanism 72 such as a rotary damper of the type known in the art, with the damper mechanism 72 operable for retarding or slowing a rate of rotation of the bulkhead 20 to thereby facilitate its repositioning. The cross-link 48 extends laterally across the body 14 of the vehicle 10 of FIG. 2, with the ends 68 of the cross-link 48 being disposed within a mating recess or hole (not shown) below the level of the bed 13, and with the forks 46 each optionally extending through a slot or opening (not shown) in the body 14 for added concealment. The handle portion 44 thus provides a handhold with which to exert a motive force on the bulkhead 20, while the pivot mechanism 160 supports a substantial portion of the weight of the bulkhead 20.

Figure 7B:
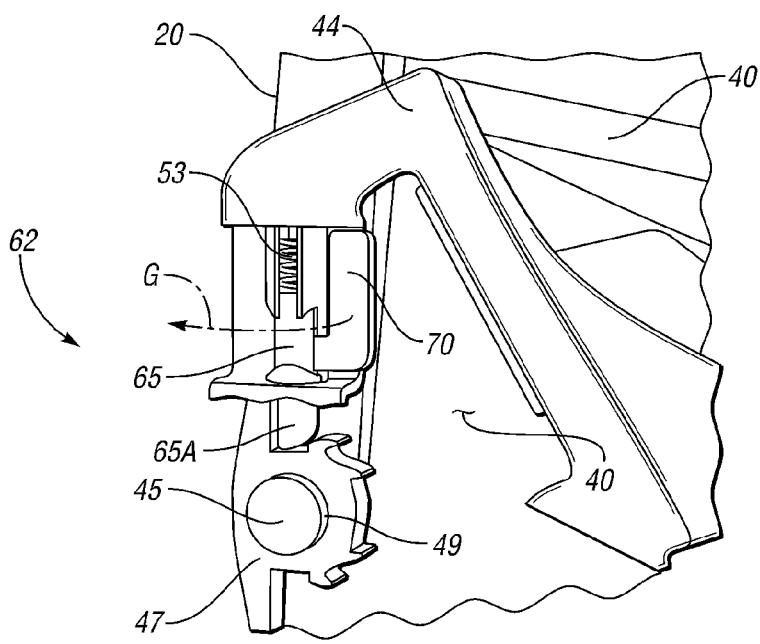

Referring to FIG. 7b, the handle portion 44 of the pivoting mechanism 160 of FIG. 7a is shown with a portion removed to present certain structural detail of the damper mechanism 72. Within the gear mechanism 62, a spring-loaded reversible ratchet pin 65 with a shaped end 65A provides an interlock with a ratchet gear piece 47. The ratchet gear piece 47 has a through-hole or bore 49 for receiving the pin 45, to which the ratchet gear piece 47 is operatively connected so that the ratchet gear piece 47 rotates in unison with the pin 45 and the bulkhead 20. When holding the handle portion 44, a user can move a hinge, a lever, or a switch 70 in the direction of arrow G to thereby orient the ratchet pin 65 in such a way as to allow the bulkhead 20 to be rotated in only one direction.

That is, the shaped end 65A of the ratchet pin 65 is reversible, i.e., when the ratchet pin 65 is positioned in one manner, the bulkhead 20 is prevented from rotating in a first rotational direction. When rotation is again desired in the first rotational direction, the switch 70 is returned to its initial position, and rotation is thereby prevented in the opposite rotational direction. The ratchet gear piece 47 can be likewise sufficiently shaped so as to prevent rotation of the bulkhead 20 through only a portion of its total range of motion, which due to its shape may be unbalanced through an initial portion of its rotation. As the ratchet pin 65 moves along the ratchet gear piece 47, a biasing force is provided by a spring mechanism 53 to ensure that the ratchet pin 65 remains in contact with the ratchet gear piece 47.

While the rotation of the bulkhead 20 of FIG. 3 can be enabled by use of a direct connection to the body such as via the pins 45 of FIG. 3 and the inclined slots 25 and pivot openings 31 of FIG. 2, or by using a pivoting mechanism such as the exemplary pivoting mechanism 160 of FIGS. 7a and 7b, those of ordinary skill in the art will recognize that other mechanisms or devices, whether manual or motor-assisted/automatic, may be used within the scope of the invention to facilitate rotation of the bulkhead 20. Likewise, while rotating the bulkhead 20 in place while attached to the body 14 as described hereinabove is believed to be an efficient means for reversing the orientation of the bulkhead 20, the bulkhead 20 may be alternately rotated manually or apart from the body 14 of FIG. 1. For example, the bulkhead 20 could be lifted from the body 14 and manually reversed, then repositioned into one of the positions A and B of FIG. 1 as desired.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a body defining a vehicle interior and a cargo bed; and
   a reversible bulkhead assembly that is positioned between the vehicle interior and the cargo bed;
   wherein the reversible bulkhead assembly is selectively rotatable with respect to the body between a first and a second position to thereby provide a first cargo bed configuration at the first position and a second cargo bed configuration at the second position, the second cargo bed configuration having a length that is different from a length of the cargo bed in the first cargo bed configuration; and
   wherein the vehicle interior is larger in the second cargo bed configuration than it is in the first cargo bed configuration.

2. The vehicle of claim 1, wherein the reversible bulkhead assembly has a concave side for increasing the length of the cargo bed in the first cargo bed configuration, and a convex side for decreasing the length of the cargo bed in the second cargo bed configuration.

3. The vehicle of claim 2, further comprising a pair of pins each operatively connected to the reversible bulkhead assembly, and a pair of pivot holes configured for receiving a respective one of the pair of pins;
   wherein the reversible bulkhead assembly is selectively rotatable within the pair of pivot holes about an axis of the pins.

4. The vehicle of claim 2, further comprising a pivoting mechanism operable for facilitating the selective rotation of the reversible bulkhead assembly.

5. The vehicle of claim 4, wherein the pivoting mechanism includes at least one of: a gear assembly that selectively prevents rotation of the reversible bulkhead assembly, and a rotary damper mechanism that is operable for retarding a rate of rotation of the reversible bulkhead assembly.

6. The vehicle of claim 5, wherein the pivoting mechanism includes the gear assembly; and
   wherein the gear assembly includes a reversible ratchet pin and a switch, the reversible ratchet gear preventing rotation of the reversible bulkhead assembly in a first rotational direction when the switch is set to a first position, and preventing rotation of the reversible bulkhead assembly in a second direction when the switch is set to a second position.

7. The vehicle of claim 1, wherein the reversible bulkhead assembly is formed at least partially of molded plastic.

8. The vehicle of claim 1, further comprising a latch that is operable for securing the reversible bulkhead assembly to the body.

9. A reversible bulkhead assembly for use with a vehicle body defining a vehicle interior and a cargo bed, the reversible bulkhead assembly comprising:
   a plurality of walls defining a concavity;
   wherein the reversible bulkhead assembly is rotatable in a first rotational direction with respect to a first position to thereby place the concavity adjacent to and facing the vehicle interior, and to thereby decrease a length of the cargo bed while increasing a size of the vehicle interior; and
   wherein the reversible bulkhead is rotatable with respect to the vehicle body to a second position to thereby place the concavity adjacent to and facing the cargo bed, and to thereby increase the length of the cargo bed while decreasing the size of the vehicle interior.

10. The reversible bulkhead assembly of claim 9, further comprising a pair of pins operatively connected to the reversible bulkhead assembly;

wherein the reversible bulkhead assembly is rotatable approximately 180 degrees in each of a first rotational direction and a second rotational direction about a common axis of the pair of pins.

11. The reversible bulkhead assembly of claim 10, wherein the vehicle body defines a pair of inclined slots each terminating in a different pivot hole, and wherein each of the inclined slots and the different pivots holes are configured for receiving a respective one of the pair of pins.

12. The reversible bulkhead assembly of claim 10, further comprising a pivoting mechanism that is operatively connected to each of the pair of pins, and that is operable for facilitating the rotation of the reversible bulkhead assembly.

13. The reversible bulkhead assembly of claim 12, wherein the pivoting mechanism includes a gear mechanism for selectively preventing rotation of the bulkhead.

14. The reversible bulkhead assembly of claim 12, wherein the pivoting mechanism includes a rotary damper that is operable for retarding a rate of rotation of the reversible bulkhead assembly.

15. The reversible bulkhead assembly of claim 9, wherein the reversible bulkhead is formed of at least one piece of plastic, and defines at least one window opening.

16. A vehicle comprising:

a body defining a vehicle interior and a cargo bed; and a reversible bulkhead assembly having a concave side and a convex side;

wherein the reversible bulkhead assembly is selectively rotatable with respect to the body so as to position the concave side adjacently to the vehicle interior, thereby decreasing a length of the cargo bed; and wherein the reversible bulkhead assembly is selectively rotatable with respect to the body so as to position the concave side adjacently to the cargo bed, thereby increasing a length of the cargo bed.

17. The vehicle of claim 16, further comprising a pivoting mechanism for facilitating the rotation of the reversible bulkhead assembly;

wherein the pivoting mechanism includes a transverse member extending laterally across the body, and at least one radial member operatively connected to the transverse member at one end and to the reversible bulkhead assembly at another end.

18. The vehicle of claim 17, wherein the at least one radial member is operatively connected to one of a rotary damper for retarding a rate of the rotation of the reversible bulkhead assembly and a gear mechanism for selectively preventing the rotation of the reversible bulkhead assembly.

* * * * *